US007983559B2

(12) United States Patent
Chiang

(10) Patent No.: US 7,983,559 B2
(45) Date of Patent: Jul. 19, 2011

(54) CONFIGURABLE MULTI-RATE OPTICAL NETWORK PORT AND PROCESSING MODULES

(75) Inventor: Ting-Kuang Chiang, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 823 days.

(21) Appl. No.: 11/858,102

(22) Filed: Sep. 19, 2007

(65) Prior Publication Data
US 2008/0131118 A1 Jun. 5, 2008

(51) Int. Cl.
H04B 10/08 (2006.01)
H04J 14/00 (2006.01)
(52) U.S. Cl. .............. 398/25; 398/46; 398/51; 398/33
(58) Field of Classification Search ............. 398/25, 398/33, 46, 47, 51, 53, 54
See application file for complete search history.

(56) References Cited

U.S. PATENT DOCUMENTS

| 5,978,353 A * | 11/1999 | Iwahori et al. ........... 370/217 |
| 6,219,336 B1 * | 4/2001 | Takahashi et al. ........ 370/223 |
| 6,956,847 B2 * | 10/2005 | Heston et al. ........... 370/353 |
| 2009/0080881 A1 * | 3/2009 | Yokoyama ............... 398/16 |

* cited by examiner

Primary Examiner — Dalzid Singh
(74) Attorney, Agent, or Firm — North Weber & Baugh LLP; Ross M. Carothers

(57) ABSTRACT

Embodiments of the present invention provide an optical port that can be configured to support either high speed or low speed optical signals. In particular, these embodiments comprise a switch that defines a data-rate dependent path between the front-end optics of a network node and internal processing electronic modules. As a result, either high speed or low speed pluggable adapters may be inserted within a port and supported by the processing electronic modules.

18 Claims, 8 Drawing Sheets

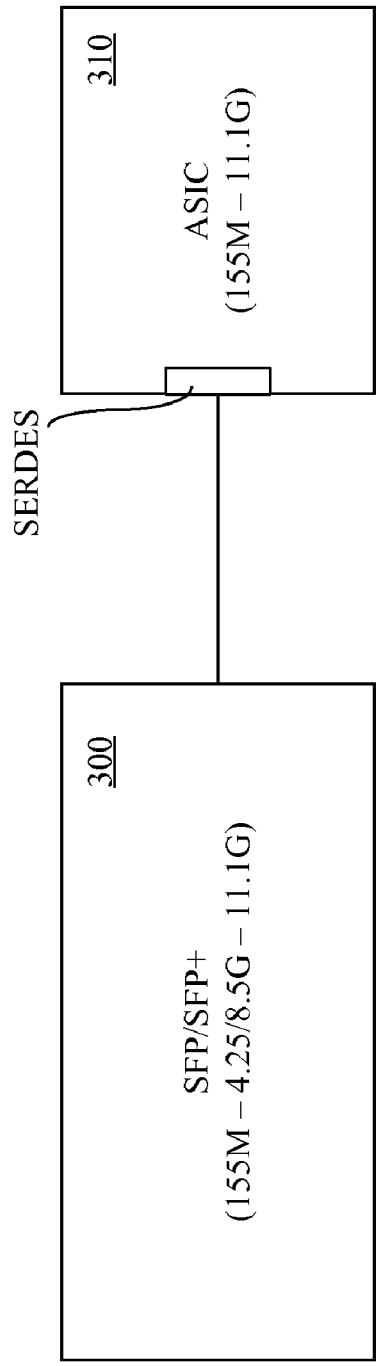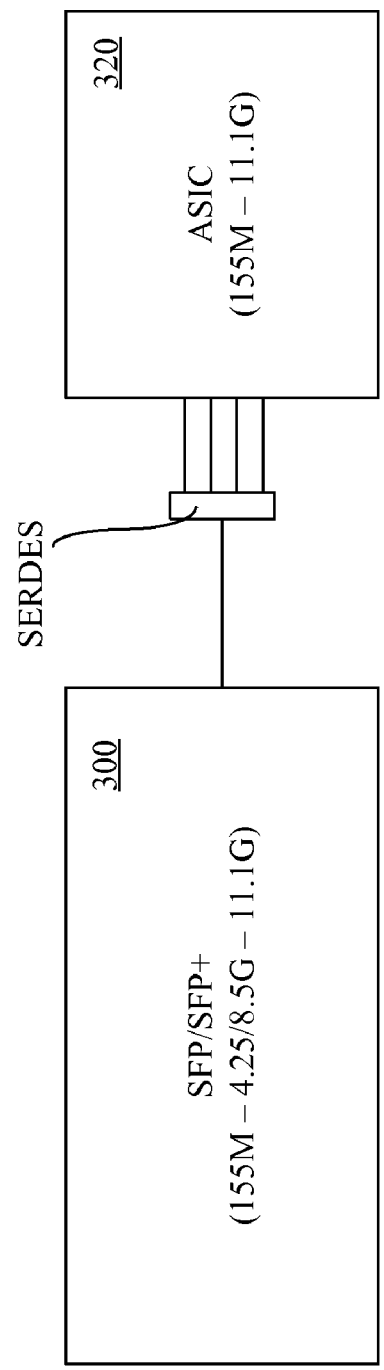
Figure 3A
Figure 3B

CONFIGURABLE MULTI-RATE OPTICAL NETWORK PORT AND PROCESSING MODULES

CROSS REFERENCE TO RELATED PATENT APPLICATIONS

This application claims priority to U.S. Provisional Application Ser. No. 60/865,389, entitled "System for Interfacing Two Different Frequency Signals from a Small Form Factor Pluggable Multi-Standard Module to an Asic Processing Circuitry Chip," filed Nov. 10, 2006.

BACKGROUND OF THE INVENTION

1. Field of the Invention

This invention relates generally to optical communication networking systems, and more particularly, to a configurable multi-rate network port and associated internal electronic processing modules within a network node.

2. Description of Related Art

The importance of optical networks in today's society is well understood. These optical networks are able to communicate large amounts of data at fast rates. Deployed optical networks may operate at different data rates depending on various factors. For example, certain networks may operate at relatively low optical data rates between 155M to 4.25 GHz. Other networks may operate at relatively high optical data rates above 4.25 GHz.

Optical networks comprise a plurality of optical nodes that communicate information through the network on multiple paths. These nodes include multiple ports on which optical signals are received and transmitted. The nodes also include internal processing modules that analyze received signals and identify a destination for the signal. As a result, an optical signal is received on a port, processed and switched internally within the node, and transmitted on another port corresponding to the destination of the signal.

These networks, and the nodes therein, are often compliant with a particular protocol or standard. This compliance allows the nodes to effectively communicate information between each other and provides the framework in which information may be analyzed internally within the node. Examples of such protocols include Ethernet, SONET, Fibre Channel, and other such protocols known to one of skill in the art.

The components within the nodes may also be defined by standards or recognized requirements. For example, the form factor of port adapters may be defined by one of numerous different standards or requirements, such as SFP, SFP+, XFP, X2, XPAK, and ZenPak. These adapters may also have different signal reaches, bit rates (e.g., 1 G, 2.5 G, or 10 G) and modes (e.g., single or multimode).

As previously discussed, a network node has multiple ports on which information is received and transmitted. These ports are typically defined as either "high speed" or "low speed" ports because of the limitations of its pluggable adapter and associated internal processing modules that analyze data received on the port.

FIG. 1 illustrates an exemplary network node having a plurality of optical ports on which optical signals are received. A low data rate port 130 on which a low frequency optical signal is received and converted to a corresponding electrical signal. The low data rate port 130 is coupled to associated low data rate electronics 145 via low speed SER-DES 140 and a low data rate switch. The low data rate switch effectively switches the electrical signal from the low data rate port 130 to one of a plurality of protocol-specific processing modules 125. As a result, the low frequency optical signal is routed from the network node front-end optics to supporting electronic processing modules according to the protocol in which the optical signal was generated.

The low data rate port 130 is typically configured to support optical signals with a low frequency range of about 155M to about 4.25 GHz. The low frequency range may be any other low frequency range as the foregoing range is purely exemplary for the purposes of this disclosure. These supported signals may be either analog or digital, and generated in accordance with various protocols known to one of skill in the art. The low data rate switch 145 effectively switches the electrical signal from the low data rate port 130 to one of a plurality of protocol-specific processing modules 125. In addition, the low data rate port 130 may comprise numerous types of pluggable form factor adapters including, but not limited to, a small form factor pluggable (hereinafter "SFP").

FIG. 1 further illustrates an exemplary network node wherein a high data rate port 100 on which a high frequency optical signal is received and converted to a corresponding electrical signal. The high data rate port 100 is coupled to associated high data rate electronics 115 via high speed SER-DES 110 and a high data rate switch. The high data rate switch 110 effectively switches the electrical signal from the high data rate port 100 to one of a plurality of protocol-specific processing modules 125. As a result, the high frequency optical signal is routed from the network node front-end optics to supporting electronic processing modules according to the protocol in which the optical signal was generated.

The high data rate port 100 is typically configured to support optical signals with a high frequency band of about 8.5 GHz to about 11.1 GHz. The high frequency range may be any other high frequency range as the foregoing range is purely exemplary for the purposes of this disclosure. These supported signals may be either analog or digital, and generated in accordance with various protocols known to one of skill in the art. In addition, the high data rate port 100 may comprise numerous types of pluggable form factor adapters including, but not limited to, SFP+, XFP, X2, XPAK, and ZenPak.

As optical signal rates continually increase, optical components, such as module port adapters, are being generated to support higher rates. For example, an SFP+ adapter has been recently introduced that supports high data rates while having the traditional form factor of an SFP adapter.

One skilled in the art will recognize the limitations of this network node configuration such that optical ports are limited by their associated electronics. In particular, a port is oftentimes exclusively designated as a "high speed" port or a "low speed" port based on the electrical processing modules to which it is coupled. This rigid definition of an optical port limits the adaptability of network nodes and the line cards therein.

SUMMARY OF THE INVENTION

Embodiments of the present invention provide an optical port that can be configured to support either high data rate or low data rate optical signals. In particular, these embodiments comprise a switch that defines a data-rate dependent path between the front-end optics of a network node and internal processing electronic modules. As a result, either high speed or low speed pluggable adapters may be inserted within a port and supported by the processing electronic modules.

In various embodiments of the invention, the configurable port can receive different types of network adapters some of which operate at high speed and some of which operate at low speeds. A switch defines a path between the configurable port and either high speed internal electronic processing modules or low speed internal electronic processing modules. The high speed data path may also include a serializer/deserializer that converts a serial data stream to a parallel stream for subsequent processing by the high speed internal electronic processing modules.

In certain embodiments, the switch may be preconfigured to define either a high speed or low speed path between the port and the electronic processing. In other embodiments, the switch automatically detects a data rate of an incoming electrical signal and switches the signal depending on the signals rate. In these embodiments, the configurable network port provides a network service provider the ability to select and/or change a port adapter that supports either high or low speed optical signals.

Certain features and advantages of the invention have been generally described in this summary section; however, additional features, advantages, and embodiments are presented herein or will be apparent in view of the drawings, specification, and claims hereof.

Accordingly, it should be understood that the scope of the invention is not limited by the particular characterizations presented in this summary section.

BRIEF DESCRIPTION OF THE DRAWINGS

Reference will be made to embodiments of the present invention, examples of which are shown in the accompanying figures. Those figures are intended to be illustrative, however, rather than limiting. Although the present invention is generally described in the context of the embodiments shown in the accompanying figures, the scope of the present invention is not restricted to the details of those particular embodiments.

FIG. 3A is a general diagram of a configurable multi-rate port and associated electronic processing modules according to various embodiments of the invention.

FIG. 3B is another general diagram of a configurable multi-rate port and associated electronic processing modules according to various embodiments of the invention.

DETAILED DESCRIPTION OF THE PREFERRED EMBODIMENTS

Embodiments of the present invention provide an optical port that can be configured to support either high speed or low speed optical signals. In particular, these embodiments comprise a switch that defines a data-rate dependent path between the front-end optics of a network node and internal processing electronic modules. As a result, either high speed or low speed pluggable adapters may be inserted within a port and supported by the processing electronic modules.

In the following description, for the purpose of explanation, specific details are set forth in order, by the use of concrete examples, to provide a sound understanding of the present invention. It will be apparent; however, that the present invention may be practiced without some or even all of those details, and it will be recognized that embodiments of the present invention, some of which are described below, may be incorporated into a number of different devices, systems, and methods. Structures, devices, and methods depicted in block diagram are merely illustrative of exemplary embodiments of the present invention and are included in that form in order to avoid obscuring essential teachings of the present invention.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Reference in the specification to "one embodiment" or "an embodiment" indicate that a particular feature, structure, characteristic, function, or method step described in connection with that embodiment is included in at least one embodiment of the present invention. The various uses of the phrase "in one embodiment" at different locations throughout the specification do not necessarily constitute multiple references to a single embodiment of the present invention.

Figure 1:
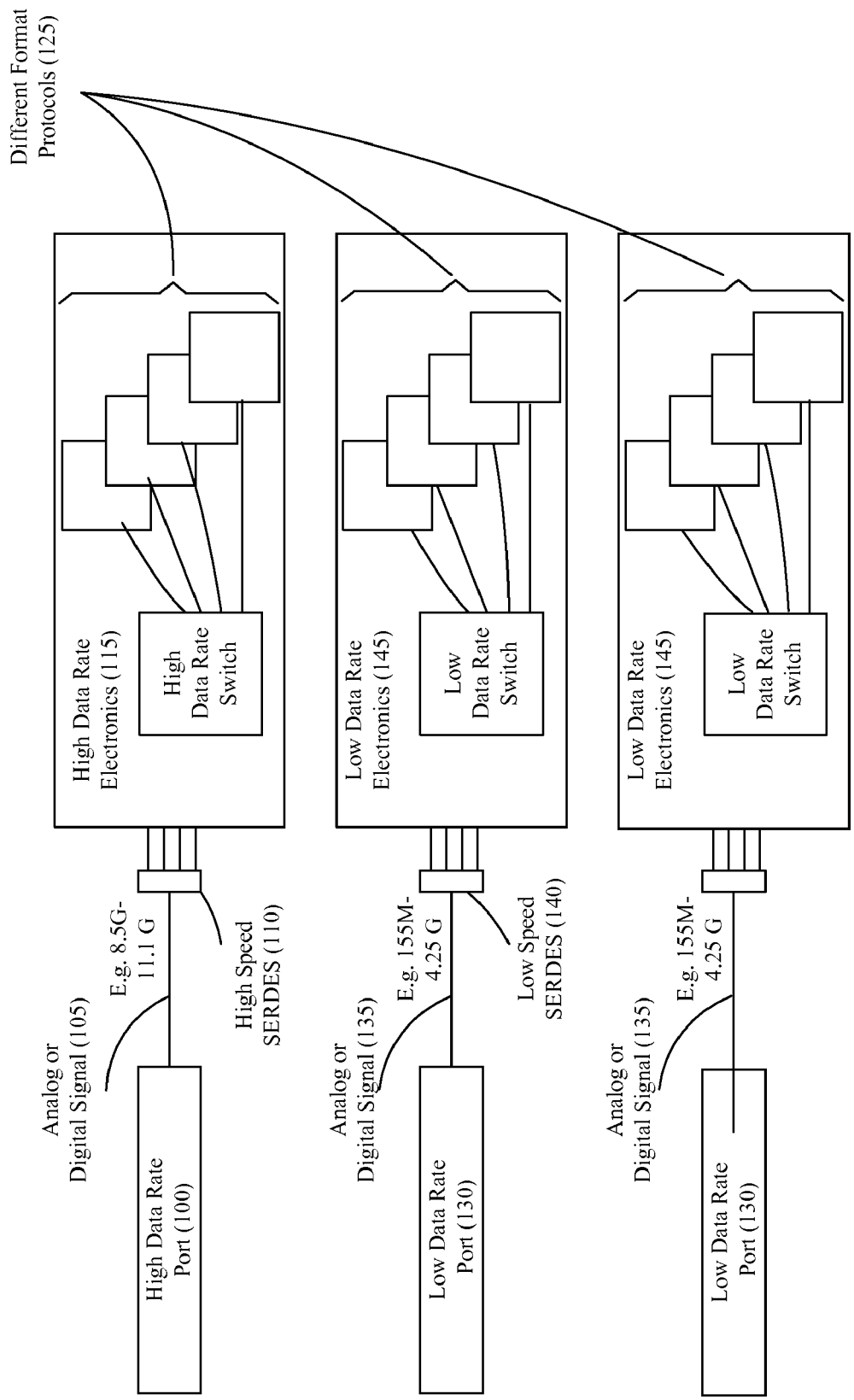
FIG. 1 is a schematic illustration of network ports and associated electronic processing modules within a network node.
Figure 2:
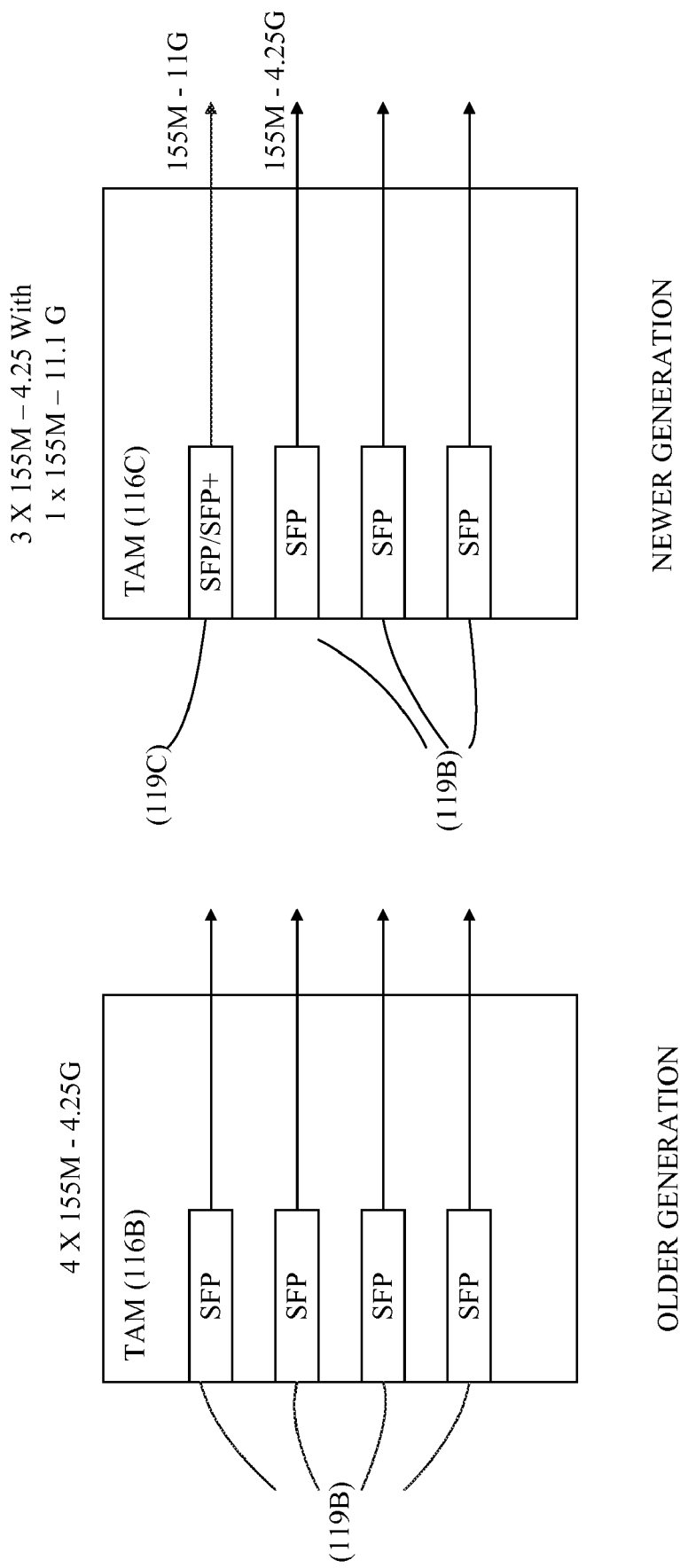
FIG. 2 illustrates an older generation transponder and newer generation transponder according to various embodiments of the invention.

FIG. 2 is an illustrative comparison of line cards, such as tributary adapter modules (hereinafter, "TAMs"), in which SFP and SFP+ pluggable adapters may be used. TAM 116B comprises four input SFP optical modules 119B that operate at or below 4.25 G. As mentioned earlier, SFP modules 119B may have different signal reaches, bit rates (e.g., 1 G, 2.5 G, or 4.25 G), and modes (e.g., single modes or multimode). These particular SFP modules 119B have been designed to receive optical signals in the low frequency range between about 155M to about 4.25 GHz.

The SFP modules 119B convert the optical signals into electrical signals for further processing within the network node. The older generation TAM 116B communicates with input switches capable of receiving signals up to 4.25 Gbps. The low speed electronics are limited to certain lower frequency signals and are unable to process higher rate electronic signals.

A new standard, SFP+, is emerging that operates in a higher frequency range, (e.g., between about 8.5 G to about 11.1 G) with a similar form factor as the SFP. The SFP+ module is shown as the newer generation card having one pluggable SFP+ module 119C in the TAM 116C along with three other pluggable SFP modules 119B. This new SFP/SFP+ module allow both high and low frequency optical signals to be received on different ports and converted to corresponding high and low frequency electrical signals to be processed within the node. The outputs from these multi-standard SFP-type (e.g., SFP AND SFP+) modules are serial interfaces.

A network engineer may plug either an SFP or an SFP+ module within the configurable port depending on the data-rate of the signal that is received at the port. This configurability provides a service provider the ability to more easily configure or adjust a network node relative to either high or low rate signals.

FIG. 3A is a general diagram showing an assembly having a configurable SFP/SFP+ port and associated electronic processing modules integrated within an ASIC according to various embodiments of the invention. The SFP/SFP+ module 300 has pluggable module interfaces capable of, but not limited to, handling both low frequency signals in the range of about 155M to about 4.25 G and high frequency signals in the range of about 8.5 G to about 11.1 G. The output of the SFP/SFP+ module is coupled to an ASIC chip 310 by a multi-rate SERDES being able to operate in both high and low frequency ranges. For example, the SERDES is able to function in a range include signals between 155M to 11.1 G. In the embodiment shown in FIG. 3A, the ASIC chip 310 has an integrated multi-rate SERDES and internal protocol specific processing modules, some of which process low speed signals and some of which process high speed signals.

FIG. 3B is another general diagram showing an assembly having a configurable SFP/SFP+ port and associated electronic processing modules integrated within an ASIC according to various embodiments of the invention. In this example, the ASIC chip 320 does not include an integrated multi-rate SERDES; rather, the SERDES is external to the chip which allows a wide range of signal rates to be interfaced with the ASIC chip 320. One skilled in the art will recognize that the multi-rate SERDES, both external and internal, are not specifically limited to a range of 155M-11.1 G, but may be implemented in various wide range values.

Figure 4:
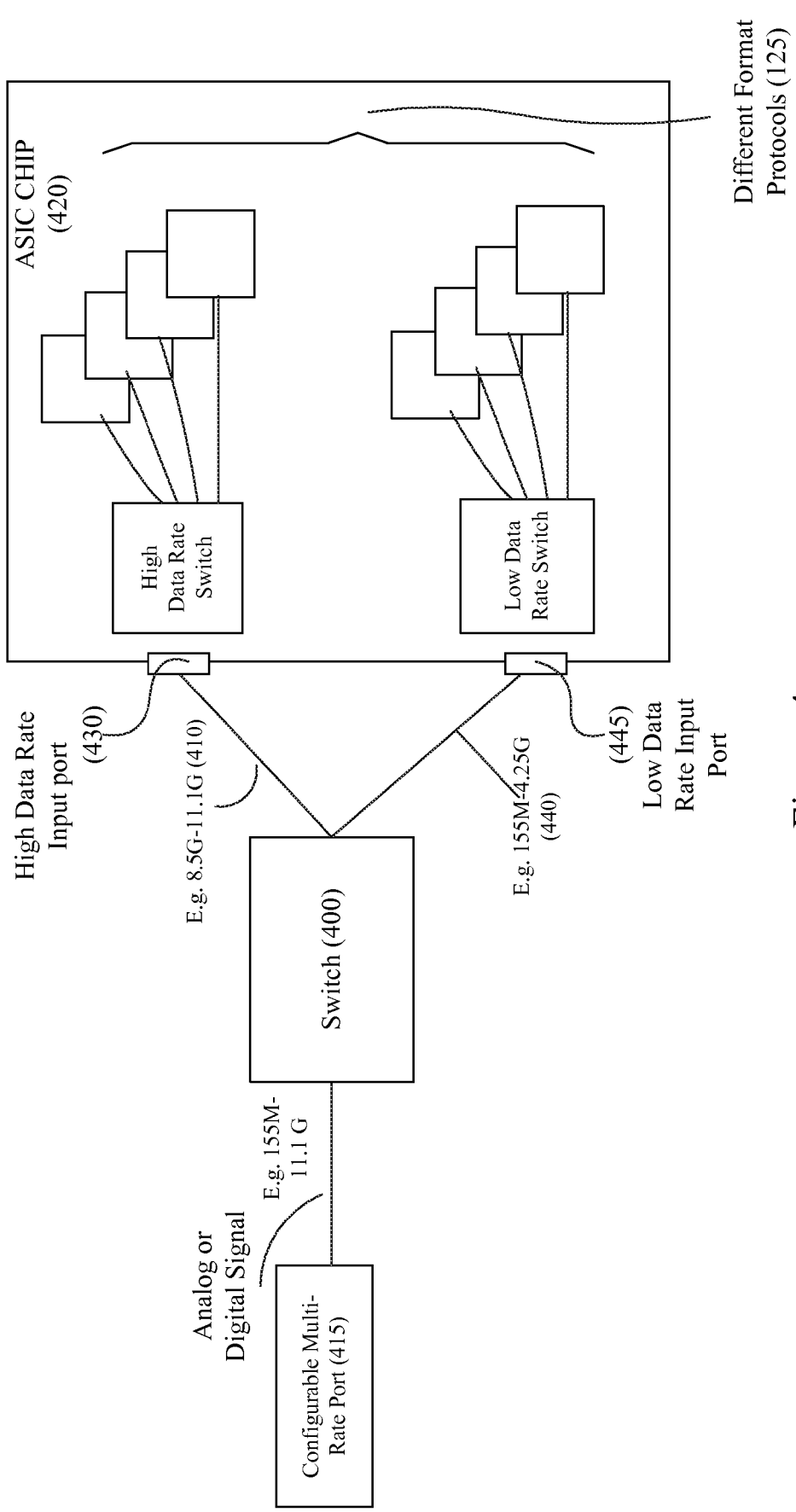
FIG. 4 is a detailed diagram of a configurable multi-rate port and associated electronic processing modules according to various embodiments of the invention.

FIG. 4 illustrates an assembly having a configurable multi-rate port and associated internal processing modules according to various embodiments of the invention. A configurable multi-rate port 415 is configurable to receive either high speed or low speed optical signals. In this particular example, the configurable multi-rate port 415 is configured to receive high-speed optical signals. The configurable multi-rate port 415 is coupled to a switch 400 which defines a high speed path from the port 415 to a plurality of high-speed, protocol-specific processing modules. As previously mentioned, the configurable multi-rate port 415 includes one of various different types of pluggable form factor adapters including, but not limited to, SFP+, XFP, XW, XPAK, and ZenPak.

The switch 400 is coupled to both a high data rate switch via a high data rate port 430 on high speed data path 410 and a low data rate switch via a low data rate port 445 on a low speed data path 440. The switch 400 may be an analog or digital switch and have additional functionality integrated within such as clock and data recovery (hereinafter "CDR").

The switch 400 may be provisioned using various methods known to one skilled in the art so that an appropriate path is defined relative to the speed of the optical signal received at the configurable multi-rate port 415. For example, the switch 400 may be manually provisioned during the time the port is installed as a high speed port to switch an optically converted electrical signal onto a high frequency path 410. As a result, the high frequency signal is transported to the high data rate switch and to one of a plurality of protocol-specific processing modules. If a low data rate port is installed, then the switch may be provisioned to switch an optically converted low speed signal to a low data rate switch and to one of a plurality of protocol-specific processing modules.

Alternatively, in another embodiment of the present invention, switch 400 can have an auto discovery capability to discern the signal frequency from the configurable multi-rate port 415 and configure the switch 400 to send the signal on the high frequency path 410 or the low frequency path 440 depending on the detected rate of an incoming electrical signal from the port 415. The auto discovery rate detector may include a CDR which has a default position and upon receipt of the electrical signal from the port 415, moves either to a higher frequency or a lower frequency until it locks onto the detected signal from the configurable multi-rate port 415.

The switch 400 may be provisioned to preserve or enhance signal integrity with the network and furthermore be as simple as an analog and asynchronous or as complex as signal conditioner, jitter clean up, and amplifier. In certain embodiments of the invention, the speed of the switch may be irrelevant and the switch may be implemented as a standalone switch or integrated within the electronics that include the protocol-specific processing modules or integrated within the front-end optics of the line card.

Figure 5:
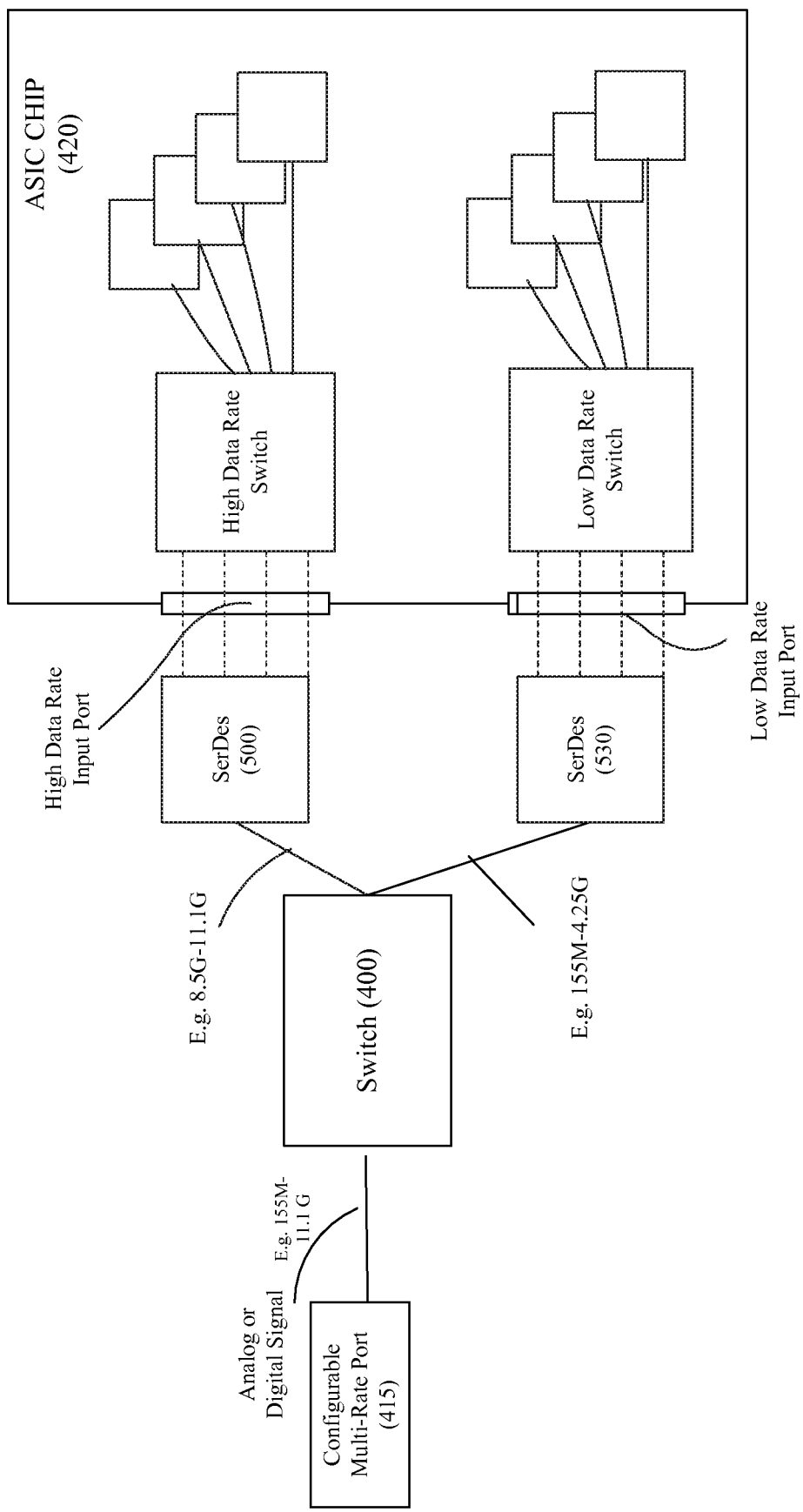
FIG. 5 is a detailed diagram of a configurable multi-rate port and associated electronic processing modules according to various embodiments of the invention.

FIG. 5 illustrates an assembly having a configurable multi-rate port and associated internal processing modules according to various embodiments of the invention. A serializer/deserializer (hereinafter, "SERDES") 500 is located within a high speed data path that coverts a serial stream to a parallel stream prior to being processed by a protocol-specific processing module.

As previously described in relation to FIG. 4, embodiments of the invention allow a configurable multi-rate port to be configured as either a high frequency port or a low frequency port. According to various embodiments of the invention, the port is configured as a high data rate port that receives optical network signals within a high frequency band and converts an optical signal to a corresponding electrical signal. The high data rate port 400 is coupled to a switch 400 that may define either a high speed path or a low speed path depending on the rate of the optical signal received on the port.

A SERDES 500 is coupled between the switch 400 and the high data rate electronics with ASIC 420. This SERDES 500 deserializes the high speed serial electrical signal into a plurality of parallel data streams. In various embodiments of the invention, the SERDES outputs four parallel signals that are provided to the high data rate electronics, (e.g., a 10 G signal can be divided up into four (4) 2.5 G signals, or a 40 G signal may be divided up into four (4) 10 G signals). As already described, the high data rate electronics comprises multiple protocol-specific processing modules that allow different types of optical signals to be analyzed.

The SERDES 500 may be bidirectional, (e.g. a multiplexing device or a demultiplexing device), and function as an integrated or stand alone device. One skilled in the art will recognize that various types of methods and structures may be used to serialize and deserialize a high speed electrical signal.

A SERDES 530 may also be located within the low rate data path and provide the same deserializing functionality in this path. Similar to the other SERDES 500, this SERDES 530 may be bidirectional, (e.g. a multiplexing device or a demultiplexing device), and function as an integrated or stand alone device.

Figure 6:
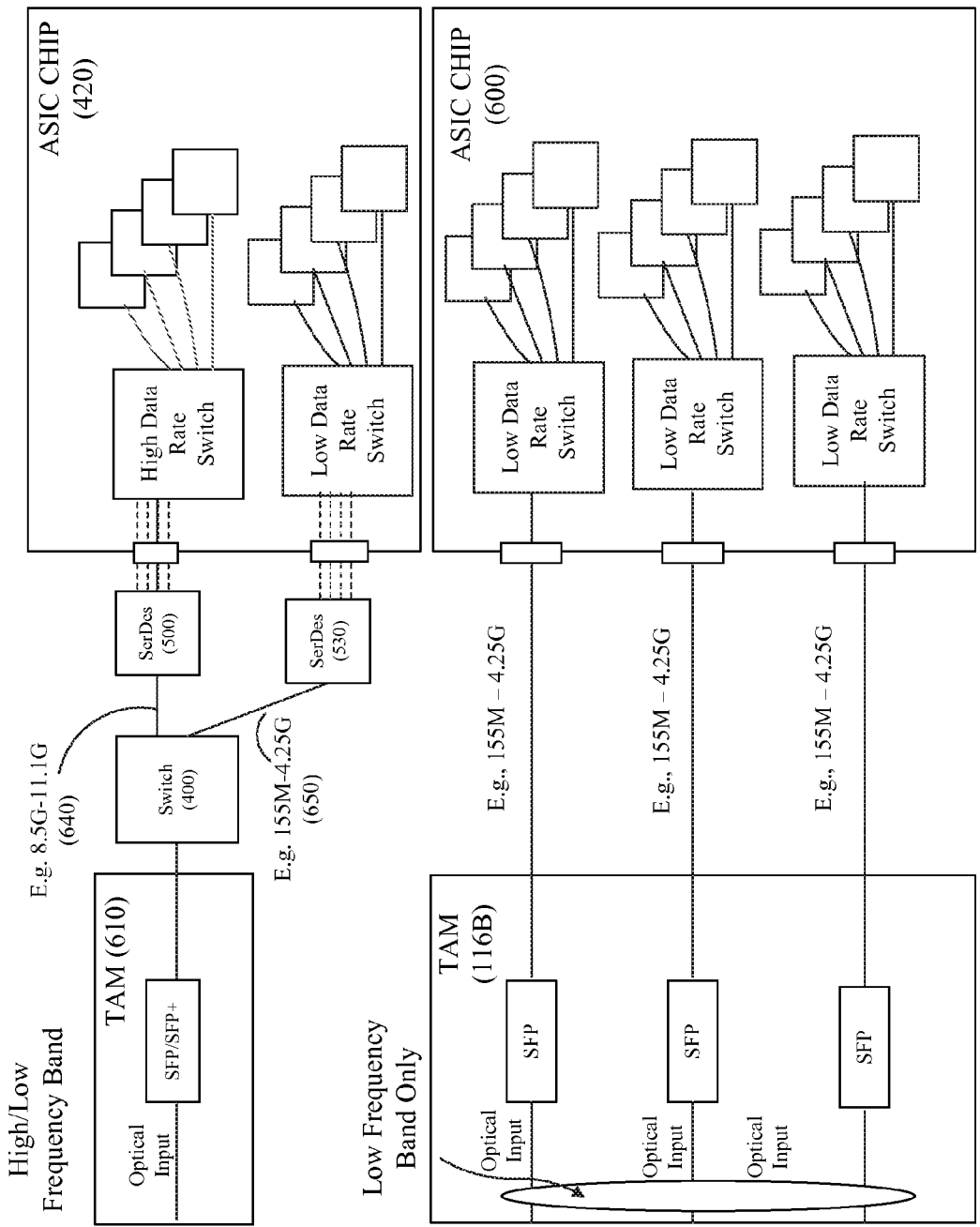
FIG. 6 is a detailed diagram of a plurality of configurable multi-rate ports and associated electronic processing modules according to various embodiments of the invention.

FIG. 6 is a more detailed diagram of an assembly of two line cards having a plurality of optical ports according to various embodiments of the invention. In various embodiments the line cards may be TAMs that receive a client signal and provision the signal to a particular format for transportation across an optical network. Furthermore, the ports on the TAMs may be SFP or SFP/SFP+ modules.

An optical signal received on the SFP/SFP+ port is converted to electrical signals and transported to a processing ASIC 420. Optical signals received on the SFP ports are converted to electrical signals and transported to a processing ASIC 600.

In various embodiments of the invention, TAM 116B is configured to receive optical signals in the frequency range of about 8.5 GHz to 11.1 GHz and TAM 116B is configured to receive optical signals in the frequency range of about 155M to 4.25 GHz. TAM 116B comprises a plurality of SFP modules from which optically converted electrical signals 135 are transmitted via a plurality of data paths to a plurality of low speed input switches coupled to a plurality of low data rate electronics. These low speed data paths may or may not comprise a SERDES that converts a serial data stream into a parallel stream. The low data rate electronics include a plurality of protocol-specific processing modules, within ASIC chip 600, whereby the electrical signals are processed according to the protocol of the optical signal. The connections between the front-end optics of TAM 116B and the back-end electronics are point-to-point connections.

TAM 610 comprises a configurable SFP/SFP+ module that can be configured as either a high speed optical port or a low speed optical port. An optical signal, at a high or low frequency signal rate, received by the SFP/SFP+ module 100 of TAM 610 is converted to a corresponding electrical signal for further processing within the network node. A switch 400, coupled to TAM 610, receives the optically converted electrical signal and, based on the rate of the electrical signal, sends the signal to a high data rate SERDES 500 and to a high data rate switch 110 on a high speed data path 640 or a low data rate SERDES 530 and to a low data rate switch on a low speed data path 650.

Low data electronics, coupled to switch 400 via low speed data path 650, receives the low speed signal and transport the low speed to signal to a plurality of protocol-specific processing circuits, within ASIC chip 420. As a result, the low frequency optical signal is routed from the network node front-end optics to supporting electronic processing modules according to both the rate and protocol in which the optical signal was generated.

The high data rate switch is communicatively coupled to the switch 400 and includes a plurality of protocol-specific processing modules. The high data rate electronics is coupled to a high rate switch to effectively switch the electrical signal to one of a plurality of high data rate protocol-specific processing modules, within ASIC chip 310. As a result, the high frequency optical signal is routed from the network node front-end optics to supporting electronic processing modules according to the rate and protocol in which the optical signal was generated.

Figure 7:
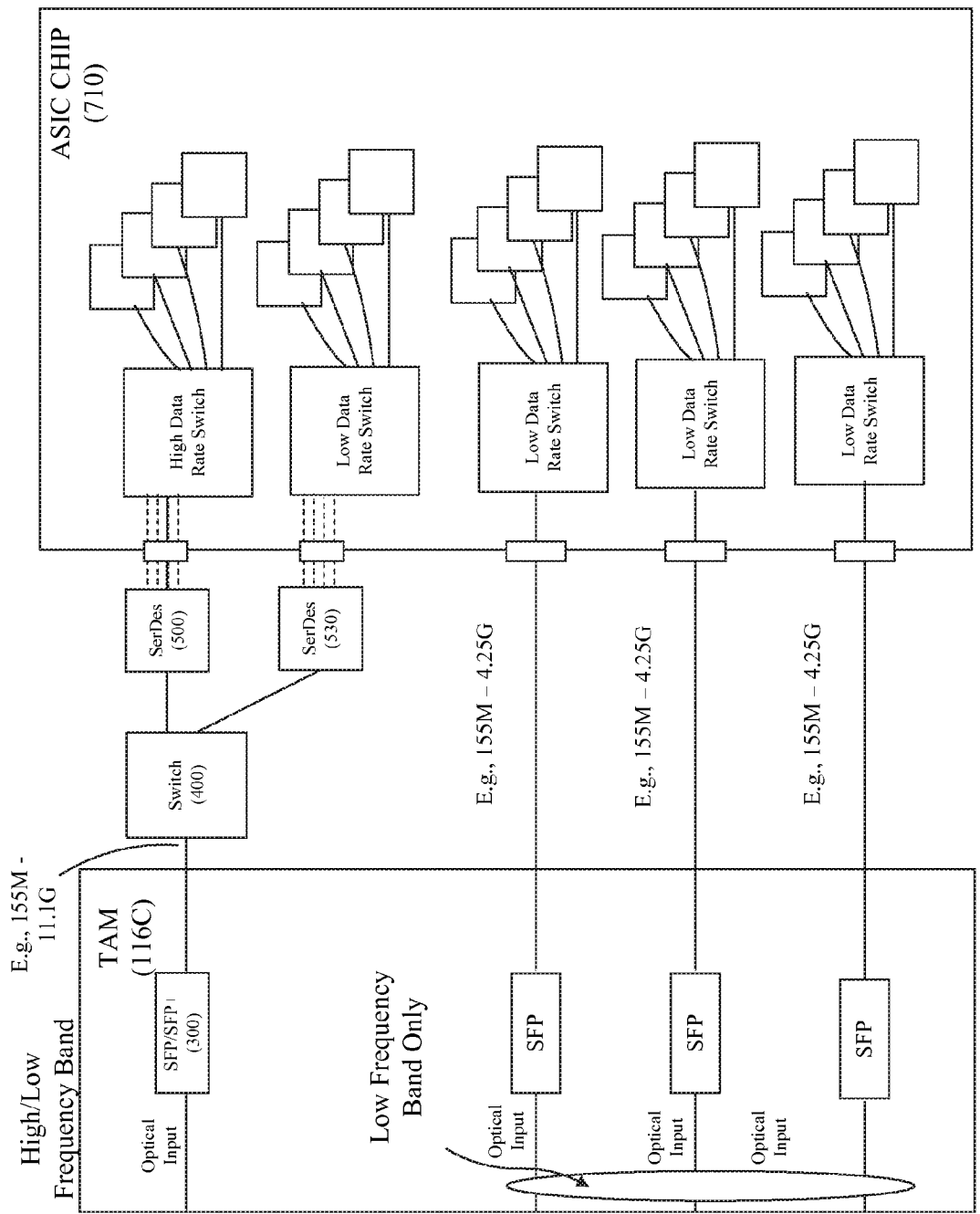
FIG. 7 is a detailed diagram of a plurality of configurable multi-rate ports and associated electronic processing modules according to various embodiments of the invention.

FIG. 7 is a diagram of line card assemblies having a plurality of optical ports according to various embodiments of the invention. In various embodiments the line card may be a TAM that receives client signals and provisions the signal to a particular format for transportation across an optical network. Furthermore, the ports on the TAM may be SFP or SFP/SFP+ modules.

TAM 116C comprises at least one SFP/SFP+ module to process an optically converted electrical signal ranging from about 155M to 11.1 Gbps, and a plurality of SFP modules to process multiple optically converted electrical signals ranging from about 155M to 4.25 Gbps. The multi-pluggable device can receive multiple optical signals and transmit an optically converted electrical signal within the network node in the frequency range of about 155M to 11.1 Gbps. This embodiment takes advantage of a TAM having multiple ports in which different types of adapter modules are used.

The low frequency ports having SFP adapter modules are coupled directly to respective low frequency switches. These adapter modules convert the low frequency optical signals to corresponding electrical signals and provide them to low frequency electronics on ASCI chip 710. The low frequency electronics include protocol-specific processing modules that process the electrical signal according to the protocol in which it was generated.

The SFP/SFP+ port 300 is coupled to a switch 400 that switches an electrical signal corresponding to the optical signal received on port 300 to either a high frequency path or a low frequency path. The high frequency path includes a SERDES 500 that deserializes the electrical signal and provides this deserialized signal to the high data rate switch on the ASIC 710. The deserialized high speed signal is switched to one of a plurality of protocol specific processing modules within ASIC chip 710.

The switch 400 is also connected to a low frequency path that includes SERDES 530 that deserializes the electrical signal and provides this deserialized signal to the low data rate switch on the ASIC 710. The deserialized low speed signal is switched to one of a plurality of protocol specific processing modules within ASIC chip 710.

ASIC chip 710 has multiple low frequency input ports and at least one high speed input port configured to receive SFP/SFP+ module 300 signals. This configuration allows a service provider more ability to configure a network node. In particular, a basic architecture may be used and configured to process both high and low speed optical signals by plugging in the appropriate adapter module into the node port.

While the invention has been described in conjunction with several specific embodiments, it is evident to those skilled in the art that many further alternatives, modifications, and variations will be apparent in light of the foregoing description. For example, any type of adapter module may be used within a configurable port because of the different data rate paths and the different protocol-specific processing modules. Additionally, the various components within the assembly may be integrated or standalone components.

Figure 8:
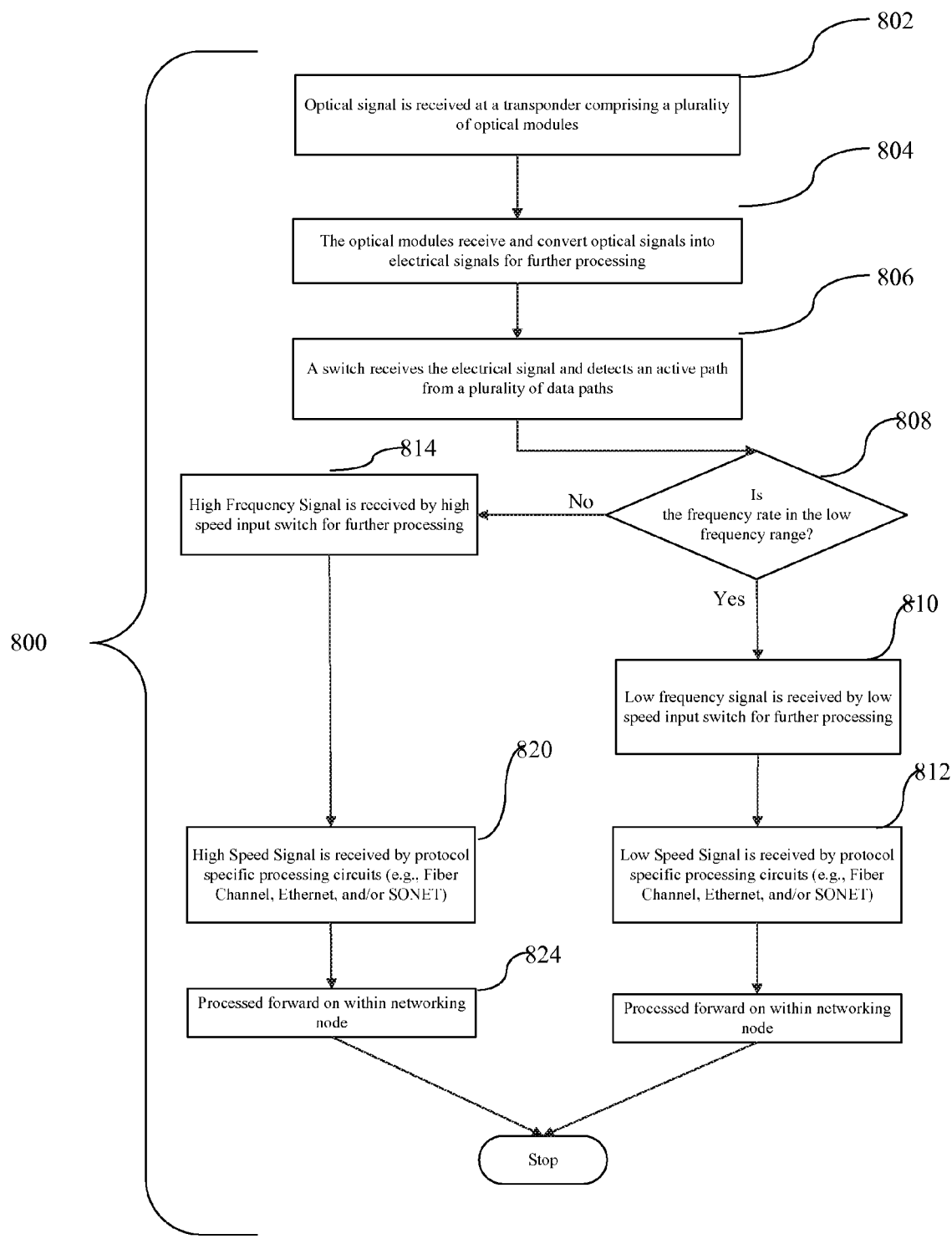
FIG. 8 is a flow chart illustrating a method for receiving and processing an optical signal on an optical port and associated processing modules according to various embodiments of the invention.

FIG. 8 is a flow chart illustrating a method, independent of structure, for receiving and processing a network signal within a configurable port assembly structure within a network node. In accordance with this method 800, a predetermined client side optical signal is received 802 at a transponder port, whereby the predetermined optical signal ranges from 155M to 11.1 GHzs.

The optical signal is received 804 by at least one or more adapter modules, whereby the optical signal is converted to an electrical signal for further processing. The signal is received 806 by a switch and the frequency baud rate is determined. Depending on the frequency rate of the signal received at the switch, the signal is switched 808 on either a high speed path or a low speed path. In certain embodiments, the switch is provisioned prior to receiving the signal and in other embodiments, the switch analyzes the signal to determine its rate.

If the signal is within a low frequency range (e.g., 155M to 4.25 G) the electrical signal is switched on a low frequency path and received 802 by a low speed input switch on electronics supporting the port. The low speed input switch switches 812 the signal to one of a plurality of protocol-specific processing modules (e.g., Fibre Channel, Ethernet, SONET, etc.). Thereafter, the processed signal is forwarded 813 on within the network node.

If the signal is within a high frequency range (e.g., 8.5 G to 11.5 G) the electrical signal is switched on a high frequency path and received 814 by a high speed input switch on electronics supporting the port. The high frequency path may include structure for deserializing/demultiplexing the high speed signal into a parallel signal. The low speed input switch switches 820 the signal to one of a plurality of protocol-specific processing modules (e.g., Fibre Channel, Ethernet, SONET, etc.). Thereafter, the processed signal is forwarded 824 on within the network node.

The foregoing description of the invention has been described for purposes of clarity and understanding. It is not intended to limit the invention to the precise form disclosed. Various modifications may be possible with the scope and equivalence of the appended claims. For example, in the future, the high frequency and low frequency ranges may be different from those exemplified in the foregoing description. For example, the high frequency range could be expanded to about 8.5 GHz to 20.1 GHz or higher; or, alternatively, shifted to be between 10 GHz and 40 GHz or 100 GHz. The same would be true of the low frequency range. The principal aspects of this invention are not limited to any specific frequency ranges described above (on both high and low frequency paths), which ranges would be only limited by the capacity and data rates of electronics, such as SERDES components and electrical processing modules.

What is claimed is:

1. An assembly comprising:
   an optical port configured to receive an optical signal;
   an optical to electrical converter configured to convert the optical signal to an electrical signal having a data rate;
   a switch having an input, and first and second outputs, the switch configured to receive the electrical signal on the input and provide the electrical signal to one of the first and second outputs depending on the data rate, the first output coupled to a first path and the second output coupled to a second path;
   a first frequency processing circuit configured to process the electrical signal in accordance with a first protocol;
   a first serializer/deserializer coupled to the first output of the switch, upon the switch providing the electrical signal to the first output of the switch, the first serializer/deserializer configured to receive the electrical signal from the first output of the switch and convert the electrical signal to a first parallel signal, the first parallel signal being provided to the first frequency processing circuit;
   a second frequency processing circuit configured to process the electrical signal in accordance with a second protocol; and
   a second serializer/deserializer coupled to the second output of the switch, upon the switch providing the electrical signal to the second output of the switch, the second serializer/deserializer configured to receive the electrical signal from the second output of the switch and convert the electrical signal to a second parallel signal, the second parallel signal being provided to the second frequency processing circuit.

2. The assembly of claim 1 further comprising a high speed input switch, coupled to the switch by the first path, that switches the electrical signal to the first frequency processing circuit.

3. The assembly of claim 2 wherein the first frequency processing circuit is a corresponding one of a plurality of first frequency processing circuits, each coupled to the high speed input switch.

4. The assembly of claim 1 further comprising a low speed input switch, coupled to the switch by the second path, that switches the electrical signal to the second frequency processing circuit.

5. The assembly of claim 4 wherein the second frequency processing circuit is a corresponding one of a plurality of second frequency processing circuits, each coupled to the low speed input switch.

6. The assembly of claim 1 wherein the switch is manually provisioned to provide the electrical signal on one of the two outputs of the switch based on an adapter module provisioned within the optical port.

7. The assembly of claim 6 wherein the adapter module is selected from a group consisting of an SFP module, an SFP+ module, an XFP module, an X2 module, an XPAK module, and a ZenPak module.

8. The assembly of claim 1 wherein the electrical signal has a data rate between 8.25 Gbps and 11.1 Gbps, the switch providing the electrical signal on the first output coupled to the first path.

9. The assembly of claim 1 wherein the electrical signal has a data rate between 155 Mbps to 4.5 Gbps, the switch providing the electrical signal on the second output coupled to the second path.

10. The assembly of claim 1 wherein the first frequency processing circuit operates in accordance with a protocol selected from a group consisting of a Fiber Channel protocol, a SONET protocol, an Ethernet protocol, a Frame Relay protocol, an TCP/IP protocol and an Optical Transport Network protocol.

11. The assembly of claim 1 wherein the second frequency processing circuit operates in accordance with a protocol selected from a group consisting of a Fiber Channel protocol, a SONET protocol, an Ethernet protocol, a Frame Relay protocol, an TCP/IP protocol and an Optical Transport Network protocol.

12. A method comprising the steps of:
    receiving an optical signal at an optical port;
    converting the optical signal to an electrical signal having a data rate;
    transmitting the electrical signal on a switch which provides the electrical signal to one of a first path or a second path based on the data rate of the electrical signal, the first path including a first serializer/deserializer and a first frequency processing module, upon the switch providing the electrical signal to the first path, the first serializer/deserializer receiving the electrical signal on a first output of the switch and converting the electrical signal into a first parallel signal, the first parallel signal provided to the first frequency processing module, the second path including a second serializer/deserializer and a second frequency processing module, upon the switch providing the electrical signal to the second path, the second serializer/deserializer receiving the electrical signal on a second output of the switch and converting the electrical signal into a second parallel signal provided, the second parallel signal provided to the second frequency processing module; and
    processing the electrical signal with one of the first frequency processing module or the second frequency processing module.

13. The method of claim 12 wherein the data rate of the electrical signal is between 8.25 Gbps and 11.1 Gbps, the electrical signal being provided to the first path.

14. The method of claim 12 wherein the data rate of the electrical signal is between 155 Mbps and 4.25 Gbps, the electrical signal being provided to the second path.

15. The method of claim 12 wherein the first frequency processing module is a first of a plurality of first frequency processing modules, the method further comprising switching the first parallel signal to a corresponding one of the plurality of first frequency processing modules depending on a specific protocol in which the optical signal was generated.

16. The method of claim 15 wherein each of the plurality of first frequency processing modules operates in accordance with a protocol selected from a group consisting of a Fiber Channel protocol, a SONET protocol, an Ethernet protocol, a Frame Relay protocol, an TCP/IP protocol and an Optical Transport Network protocol.

17. The method of claim 12 wherein the second frequency processing module is a first of a plurality of second frequency processing modules, the method further comprising switching the second parallel signal to a corresponding one of the plurality of second frequency processing modules depending on a specific protocol in which the optical signal was generated.

18. The method of claim 17 wherein each of the plurality of second frequency processing modules operates in accordance with a protocol selected from a group consisting of a Fiber Channel protocol, a SONET protocol, an Ethernet protocol, a Frame Relay protocol, an TCP/IP protocol and an Optical Transport Network protocol.

* * * * *